(12) United States Patent
Tomažič et al.

(10) Patent No.: US 12,448,115 B2
(45) Date of Patent: Oct. 21, 2025

(54) FUEL CELL WASTEWATER BALANCER

(71) Applicant: Pipistrel d.o.o., Ajdovščina (SI)

(72) Inventors: Tine Tomažič, Vrhnika (SI); Blaž Močan, Ljubljana (SI)

(73) Assignee: Pipistrel d.o.o., Ajdovscina (SI)

(*) Notice: Subject to any disclaimer, the term of this patent is extended or adjusted under 35 U.S.C. 154(b) by 3 days.

(21) Appl. No.: 18/595,970

(22) Filed: Mar. 5, 2024

(65) Prior Publication Data

US 2024/0400198 A1    Dec. 5, 2024

Related U.S. Application Data

(60) Provisional application No. 63/493,659, filed on Mar. 31, 2023.

(51) Int. Cl.
*B64C 17/08* (2006.01)
*B64D 27/355* (2024.01)

(52) U.S. Cl.
CPC ............ *B64C 17/08* (2013.01); *B64D 27/355* (2024.01)

(58) Field of Classification Search
CPC .. B64D 37/04; B64D 2041/005; B64C 17/08; B64C 17/10; B64C 37/04
See application file for complete search history.

(56) References Cited

U.S. PATENT DOCUMENTS

| 2004/0069897 | A1* | 4/2004 | Corcoran | B64C 39/12 244/10 |
| 2017/0233111 | A1* | 8/2017 | Mata | B64G 1/423 244/171.1 |
| 2023/0092281 | A1 | 3/2023 | Rawdon | |

OTHER PUBLICATIONS

Extended European Search Report issued Jul. 19, 2024, in related European Patent Application No. 24164063.0.

* cited by examiner

*Primary Examiner* — Atif H Chaudry
(74) *Attorney, Agent, or Firm* — Avek IP, LLC

(57) ABSTRACT

A system and method for having a fuel cell wastewater balancer. The wastewater balancer includes a hydrogen tank which stores hydrogen to be consumed by a fuel cell and a ballast tank which stores wastewater produced as a biproduct of the fuel cell reaction. A controller maintains the center of gravity of an aircraft by distributing wastewater to the ballast tank as hydrogen is consumed by the fuel cell.

18 Claims, 6 Drawing Sheets

FUEL CELL WASTEWATER BALANCER

CROSS-REFERENCE TO RELATED APPLICATIONS

This application claims the benefit of U.S. Provisional Patent Application No. 63/493,659, filed Mar. 31, 2023, the entire contents thereof are herein incorporated by reference.

BACKGROUND OF THE INVENTION

1. Field

The disclosed embodiments relate generally to the field of hydrogen powered aircraft. More specifically, the disclosed embodiments relate to the process of using wastewater to balance an aircraft as hydrogen is consumed disrupting the center of gravity.

2. Description of the Related Art

It is known for a fuel cell to consume hydrogen for production of power and energy. Wastewater is a known biproduct of the reaction between hydrogen and oxygen in a fuel cell. It is known to use hydrogen powered fuel cells to provide power for vehicles and other apparatuses.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In embodiments, the techniques described herein relate to an aircraft including: a hydrogen tank having a center of mass located at a first distance from the center of gravity (CG) of the aircraft; a fuel cell configured to consume hydrogen from the hydrogen tank; a ballast tank located at a second distance from the CG of the aircraft; a conduit connecting the fuel cell and the ballast tank; wherein the conduit is configured to receive wastewater resulting from the fuel cell and deliver at least part of the wastewater to the ballast tank; wherein the wastewater delivered to the ballast tank counterbalances a moment created by a depletion of hydrogen due to consumption of the fuel cell.

In some embodiments, the techniques described herein relate to a system including: a hydrogen tank located a first distance from a center of gravity (CG) of an aircraft; a ballast tank located a second distance from the CG of the aircraft; a fuel cell configured to consume hydrogen received from the hydrogen tank and produce wastewater, the system configured to deliver wastewater to the ballast tank; a controller configured to cause the system to distribute wastewater to the ballast tank to restore an imbalance in the CG.

In some embodiments, the techniques described herein relate to a method for having a wastewater balancer, the method including: supplying hydrogen stored in a hydrogen tank to a fuel cell to generate power for use on an aircraft; distributing a wastewater biproduct created from the fuel cell to a first tank and a second tank wherein an amount of wastewater is distributed to counterbalance a moment created from depletion of hydrogen in the hydrogen tank.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
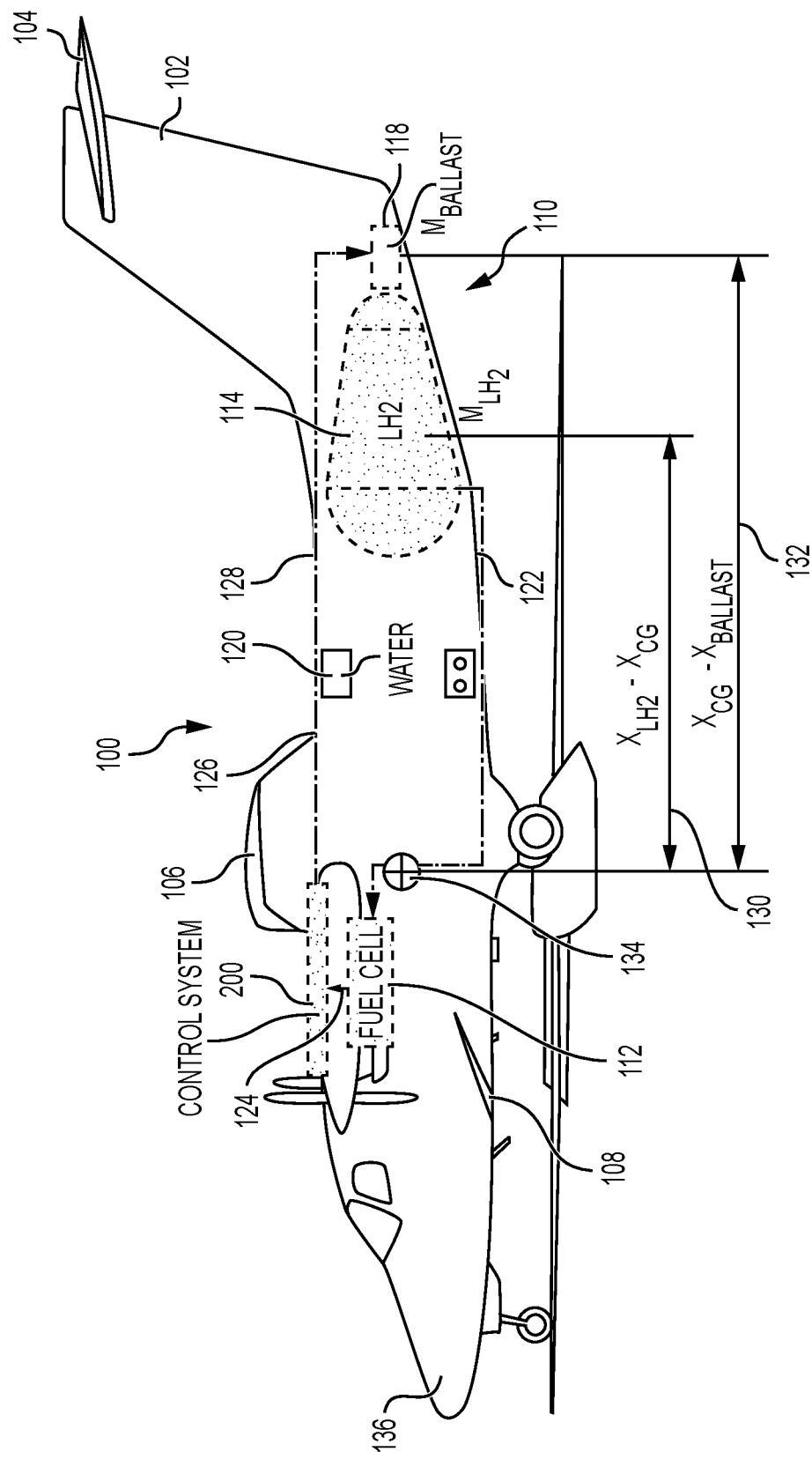
FIG. 1 is a side view of an embodiment of the system which displays an aircraft viewed through a transparent lens, showing the respective components within the aircraft body while detailing a flow of substance throughout the system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments provide systems and a method for using wastewater as a means to balance an aircraft as liquid hydrogen is consumed as fuel. The wastewater is produced by the reaction of hydrogen and oxygen in a fuel cell. In the disclosed embodiments, the wastewater will be delivered to a rearward or forward position (or lateral position) on the aircraft to counterbalance weight loss due to the consumption of liquid hydrogen in a relatively rearward tank to maintain the center of gravity on an aircraft while possibly reducing the need for trim and its associated drag. Hydrogen fuel cells are advantageous because these cells produce fewer emissions than jet fuels and have higher energy density than lithium batteries. Hydrogen fuel cells generate electricity via electrochemical reactions instead of combustion and can be used to provide propulsive power for aircraft with electrically driven propulsion or also power for an aircraft Auxiliary Power Unit (APU). These reactions occur within a fuel cell. In a fuel cell Hydrogen and Oxygen are combined to produce electricity with heat and water being biproducts of the reaction. Within the cell exists an anode, cathode, and electrolyte membrane. Hydrogen is supplied to the anode of the system and a catalyst splits apart the hydrogen molecules into protons and electrons. Protons are able to pass through the porous electrolyte membrane while the electrons are passed through a circuit generating electricity. At the cathode terminal, Oxygen, protons, and electrons are combined to produce water molecules and heat as a product to the reaction.

Hydrogen, however, provides less energy by volume than other fuels. Because of this, it must be stored in liquid form aboard the aircraft. For hydrogen to be in liquid form it must be stored in an environment able to maintain a pressure of roughly 1-5 bar and a temperature of −253 degrees Celsius. The liquid form of hydrogen has an energy density of approximately 4 liters of hydrogen to 1 liter of standard jet fuel as well. These characteristics and storage conditions mean that hydrogen tanks will be larger than standard tanks. Due to its increased size and need for pressurization, requiring either a spherical or cylindrical form factor to achieve lower tank weights, the liquid hydrogen storage tank must be placed in the fuselage of an aircraft or as a pod under the wings, whereas traditional fuels have been stored in wings, etc. The liquid hydrogen tank should be placed near the center of gravity of the aircraft so its center of gravity can be maintained as the hydrogen within is consumed. Due to the need for keeping pressure and maintaining a low temperature of the fuel, maintaining a singular large tank is preferred as opposed to having multiple tanks from a weight point of view. A placement of the tank in the middle of the fuselage (relatively close to the center of gravity) is suboptimal because it splits the cabin space and separates the flight crew from the passengers. An alternative location to store the hydrogen tank is near the rear of the airplane in the empennage. Another alternative is to opt for a non-symmetric aircraft configuration with a fuselage carrying passengers and a large pod containing the liquid hydrogen storage and power generation system, Both of the above mentioned alternative locations however disrupt the center of gravity of the plane (longitudinally or laterally) as the hydrogen is emptied and larger pitch and roll control surfaces are required to provide more trim authority to balance the large range of center of gravity shifts which increases the weight and drag of the aircraft.

The disclosed embodiments include a system that allows for the placement of the liquid hydrogen (LH2) fuel tank 114 to be in the empennage 110 of the aircraft 100 with reference to FIG. 1. The hydrogen tank 114 includes a body with a shape that allows the tank 114 to reside within the bounds created by the aircraft fuselage 108 structure as the fuselage 108 condescends towards the empennage 110 of the aircraft. The shape of hydrogen tank 114 should not be limited in scope or definition and could be any variety of shapes depending on the size or shape of the aircraft fuselage 108 and the precise location of the hydrogen tank 114 on the aircraft 100.

Located rearwardly in the empennage 110 directly below the tail 102 and horizontal stabilizers 104 of the aircraft 100 is a wastewater ballast tank 118. The shape of the ballast tank 118, in embodiments, is configured to reside within the bounds established by the empennage 110 of the aircraft and could have any variety of shapes. The ballast tank 118 is configured with a known mass center to allow for the ballast tank 118 to act as a counterbalance against weight lost in the liquid hydrogen tank 114 as hydrogen fuel is consumed.

Shown in FIG. 1, a conduit 122 connects from the liquid hydrogen tank 114 to the fuel cell 112. Conduit 122 is where the liquid hydrogen of the hydrogen tank 114 may be allowed to change state to a gaseous or vaporous state for consumption by the fuel cell 112 if the state change did not already take place as boil-off or by using an evaporator within or in the vicinity of the hydrogen tank 114. This process can be naturally occurring due to the insulation heat losses from the tank 114 and the conduit 122, or can be forced by an additional heating element within the tank 114 or conduit 122. Additionally, hydrogen tank 114 could be equipped with a valve to release excess hydrogen to the atmosphere/exterior of the aircraft 215 in cases where hydrogen flow is not needed (e.g.: on the ground) to manage the pressure of hydrogen tank 114. From the fuel cell 112, wastewater is directed through a conduit 124 where a controller 200 controls the distribution of the wastewater.

Figure 2:
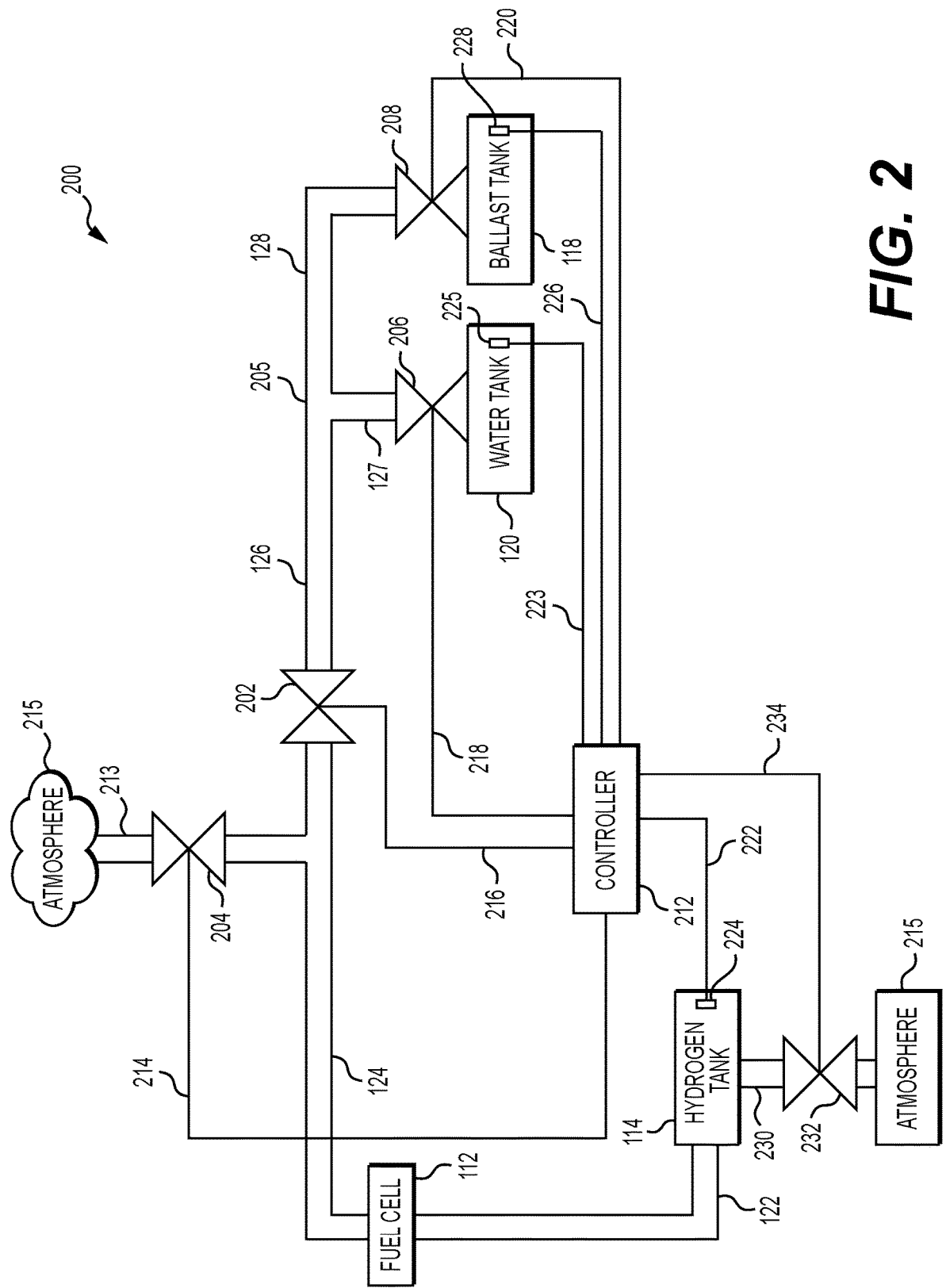
FIG. 2 is a diagram view of a control system embodiment of the system of FIG. 1 detailing a pathway for transporting wastewater to the control system and then dispersed to the rest of the system.

The details regarding an embodiment of a control system 200 are shown in FIG. 2. Referring to the figure, it may be seen that the outflowing conduit 124 from fuel cell 112 transfers the wastewater biproduct created from the electrochemical reaction generated in the fuel cell 112 to encounter control valves 202 and 204. Any wastewater passing through control valve 202 will travel through conduit 126 to reach a tee 205 branch. Tee branch 205 delivers wastewater to either water tank 120 or ballast tank 118 depending on the status of valves 206 and 208. If wastewater passes through control valve 204, it will travel through conduit/release portion 213 to be released to an exterior of the aircraft 215, which may be the atmosphere.

Although water tank 120 and ballast tank 118 are both depicted having rectangular geometries in both FIGS. 1 and 2, they would likely be configured in other ways to accommodate space needs within the fuselage 108. Additionally, tanks 120 and 118 are configured to have a size capable to enable controlled balancing of wastewater weight relative to the different liquid hydrogen levels existing in hydrogen tank 114. Conduit sections 127 and 128 are each equipped with valves 206 and 208, respectively. These valves 206 and 208 are operatively controlled by a controller 212 controlling the control system 200 shown in FIG. 2. A controller 212 (e.g., computing system with processing capabilities) will regulate the amount of water delivered to each of tanks (118 or 120) such that a consistent center of gravity (CG) 134 of the aircraft (see FIG. 1) is maintained. In embodiments, the CG 134 of the aircraft 100 is positioned substantially beneath the wings 106 and in other embodiments, the CG 134 may be positioned behind or forward of the aircraft 100 wings 106.

Figure 6:
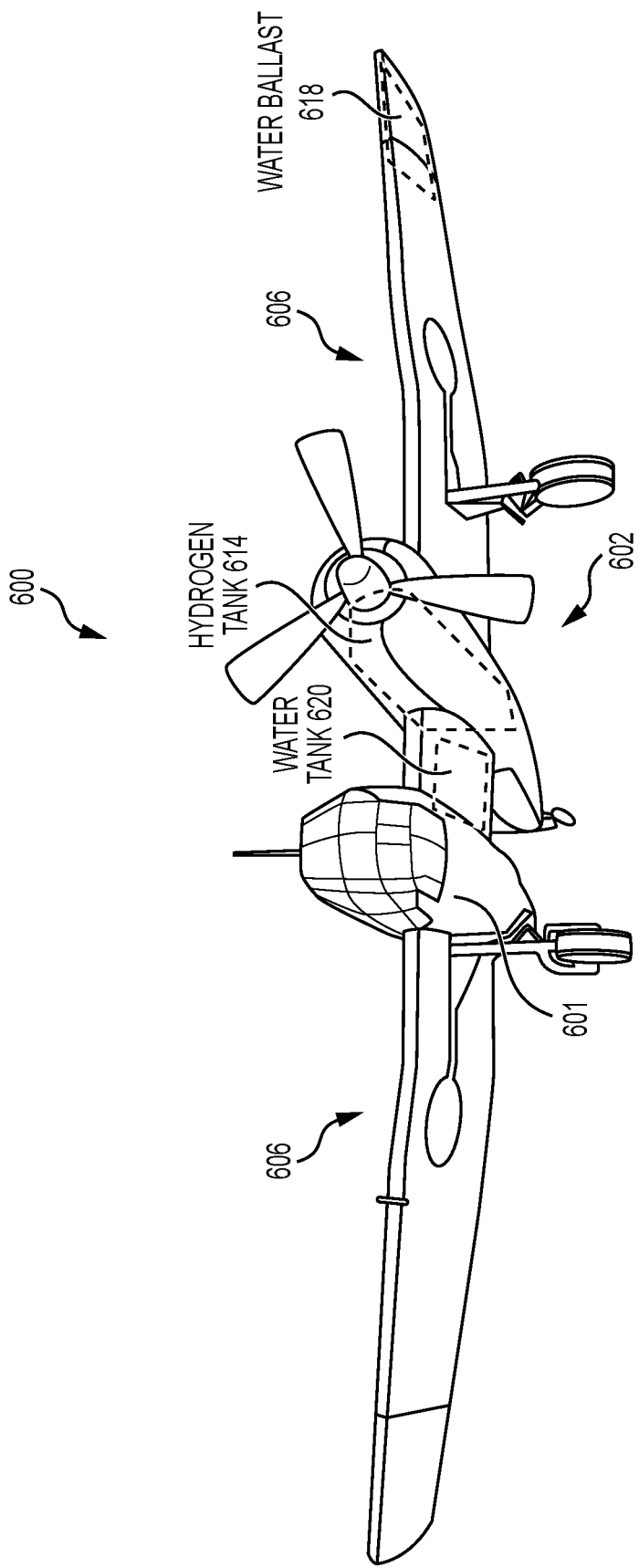
FIG. 6 is a front perspective view of another embodiment of the system which displays an aircraft viewed through a transparent lens, showing the respective components within the aircraft body.

The center of gravity for an aircraft is known to be the point where the aircraft can be balanced at a point and assume a level position. The control system 200 will account for factors, which may be physical distances aligned in a longitudinal direction (i.e. aligned with the aircraft fuselage 108) or lateral direction (i.e. aligned with the wings 106), when calculating the correct amount of water to flow to each tank (118 or 120). In embodiments, both a first physical distance 130 measured from the hydrogen tank 114 tank to the CG 134 and a second physical distance 132 from the water ballast tank 118 to the CG 134 are known by the controller 212. In embodiments, the controller 212 is able to effectively control valves 202 and 206 to control whether water tank 120 will be filled or not. Other embodiments, where the hydrogen tank 114 and the ballast tank 118 are displaced laterally, perpendicular to the longitudinal axis aligned with the fuselage 108 are also possible (FIG. 6). Regardless, the position of water tank 120 relative to CG 134 may be such that the impact of mass added to it is negligible. Alternatively, water tank 120 could be positioned longitudinally (or laterally) such that as it is filled, e.g., consuming some or all of the wastewater from the fuel cell 112, has an impact on CG 134 equilibrium. The longitudinal placement of water tank 120 could be at a location that creates a counterclockwise moment (e.g. forward location) about the aircraft (viewed from the FIG. 1 vantagepoint) and the controlled filling of the water tank 120 could balance the aircraft 100 in cases where a clockwise moment is created. In other embodiments, as seen in FIG. 6, the placement of water tank 120 could be at a location on a wing 106 that creates a counterclockwise or clockwise moment (e.g. an outboard location) and the controlled filling of the water tank 120 could substantially balance the aircraft 100 in cases where a moment is created. The term "equilibrium" as used in relation to CG 134 in this application should not be considered to require any precision in maintaining a position. The term, instead, should be interpreted as allowing for any improvement in the maintenance of the center of gravity physical location on the aircraft 100. The precise placement of water tank 120 will depend and vary based on the structural dimensions and weight distribution of the aircraft 100.

FIG. 6 shows another embodiment with an aircraft 600 including the wastewater balance system. In embodiments, the aircraft 600 includes an arrangement where an engine nacelle 602 is separated apart from and substantially parallel with an aircraft cabin or cockpit 601. In embodiments, the nacelle 602 includes the propeller and is centered between wings 606 while the cockpit 601 is positioned outboard from the nacelle 602 and extends from a forward edge of a wing 606. In embodiments, a hydrogen tank 614 may be fit within the nacelle 602. The nacelle 602 may be an advantageous location for the hydrogen tank 614 due to its large volume. In embodiments, the ballast tank 618 is located near the end of the wing 606 to establish a moment arm between the CG and the ballast tank 618. More specifically, the ballast tank 618 is positioned on the wing 606 opposite of the cockpit 601 such that its filling will substantially balance the aircraft 600. In embodiments, the water tank 620 may be positioned between the cockpit 601 and nacelle 602 closer to the CG than the ballast tank 618. In some embodiments, the water tank 620 may be placed near the end of the wing 606 opposite from the ballast tank 618 to control lateral CG which may be caused from variable payloads (e.g. passengers and luggage).

It should be understood that the system includes a hydrogen-consuming fuel cell (not shown in FIG. 6) which is fluidly connected with hydrogen tank 614 and generates wastewater in substantially the same manner as is disclosed in the system of FIGS. 1 and 2. More specifically, the fuel cell, hydrogen tank 614, ballast tank 618, water tank 620, are all connected (in the FIG. 6 embodiment) in substantially same way as shown for fuel cell 112, hydrogen tank 114, ballast tank 118, and water tank 120 in FIG. 2, respectively.

Referring back to FIGS. 1 and 2, controller 212 in the control system 200 is shown to operate with the fluid delivery network established to accomplish dynamic control in substantially maintaining CG 134 at a designed location at a substantially constant longitudinal (or lateral) location. As the control system 200 receives wastewater via conduit 124 from the fuel cell 112, it distributes the wastewater (in any variety of ways) to substantially regulate the CG 134 (substantially at a constant location, in embodiments). Controller 212 will initially allow or disallow flow to the water tank 120 and/or ballast tank 118 using valve 202 which is incorporated into conduit 124. Alternatively, the water can pass through a valve 204 (also controlled by controller 212) through release portion 213 to the exterior of the aircraft 215.

If valve 202 is open, and valve 204 is closed, the water is then allowed to pass into the conduit 126 leading to a tee 205. One branch of the tee 205 leads to conduit 127 leading to a valve 206 which is configured to control water flow into the water tank 120. Another branch 128 encounters a valve 208 which regulates water flow into the water ballast tank 118.

Each of valves 202, 204, 206, and 208 are configured to receive commands from and be operated (e.g. opened or closed) by the controller 212 by electrical (or wireless) connections 214, 216, 218, 220, and 234 respectively.

In operation, as the hydrogen fuel tank 114 releases hydrogen to the fuel cell 112 the weight distribution about the aircraft 100 changes and results in a moment aligned in the longitudinal direction (FIG. 1) or lateral direction (FIG. 6) to be created around the CG 134 of the aircraft 100. In the side view of FIG. 1, this moment would be created in a counterclockwise direction. To maintain the CG 134 and neutralize the unbalancing moment, the control system 200 includes an electrical or wireless connection 222 between the controller 212 and a sensor 224 positioned in the hydrogen tank 114. Due to the low temperature and high pressure nature of hydrogen tank 114, the hydrogen-sensor 224 may have unique capabilities to determine the mass of hydrogen in tank 114. One possible method would include a device with capabilities to measure the release of hydrogen through the conduit 122 from the hydrogen tank 114 to the fuel cell 112. Another method would involve measuring the level of hydrogen in the hydrogen tank 114, or detecting the weight of the mass of hydrogen present in the hydrogen tank 114. The controller 212 is configured to receive readings from the sensor 224 via communication line 222 reflecting the volume and/or weight of hydrogen existing in the hydrogen tank 114 so that wastewater produced by the electrochemical reaction in the fuel cell 112 can be dispersed in various ways to counteract the moment created from the consumption of hydrogen. Sensor 224 could also detect pressure levels in tank 114 so that excess hydrogen boil off could be released directly to the atmosphere/exterior of the aircraft 215. This can be accomplished via communicative connection 234 opening valve 232 so that excess hydrogen can release from the hydrogen tank 114 to conduit 230 leading to the exterior of the aircraft 215. Additionally, sensors 225 and 228 positioned in the water tank 120 and ballast tank 118 may be configured to detect water level established in each of water tank 120 and ballast tank 118 and may be communicatively connected to the controller 212 via electrical (or wireless) connections 223 and 226 made from the controller 212 to each of sensors 225 and 228, respectively. These sensors 225 and 228 may be a water-level sensor, or optionally a sensor that determines the mass of wastewater in the tank using flow into or out of the tank (118 or 120), a weight measurement or some other means. Each fluid level sensor 225 and 228 is not limited in scope in being able to detect the surface level of a fluid in a tank (118 or 120). These sensors 225 and 228 should instead be interpreted as devices capable of collecting information to determine the amount of substance within a tank. "Sensors" used in embodiments should not be considered limiting. As used within this application, a "sensor" is anything that has the capability of measuring matter. For example, level sensors or weight measurement sensors are possible methods that could be used to measure the amount of matter. Furthermore, "sensors" could also be devices capable of measuring the flow rate of fluid or vapor into or out of tanks in embodiments.

In embodiments, the initial CG location (CG 134) is calibrated, in embodiments, using a full tank of liquid hydrogen (in tank 114) before a flight and with tanks 118 and 120 empty. Since an aircraft 100 will normally have a full hydrogen tank 114 of liquid hydrogen fuel before takeoff, the CG 134 will start at equilibrium at the beginning of a flight (the longitudinal or lateral position where the center of gravity exists will be at a starting point that is optimally maintained during a flight).

In embodiments, as the hydrogen tank 114 releases hydrogen through the conduit 122 to be consumed by the fuel cell 112, the CG 134 will begin to shift forward towards the nose 136 of the aircraft 100 since the empennage 110 will contain less mass and weight. The release of hydrogen from hydrogen tank 114 creates a weight disparity due to the counterclockwise moment resulting (again, in reference to the view of FIG. 1) as the hydrogen is consumed. The control system 200 effectively controls the dispensing of the wastewater biproduct of the fuel cell 112 such that wastewater is either expelled from the aircraft 100 or otherwise managed, as detailed above, to substantially maintain the CG 134. The controller 212 maintains CG 134 at the chosen location along the length or width of the aircraft 100, and uses different processes to substantially sustain CG 134, or positively impact moments in a way that CG 134 does not drift away from equilibrium due to the liquid hydrogen depletion from the hydrogen tank 114.

The CG balancing process in embodiments may or may not involve tank 120. Regardless, the processes herein will be used to manage the filling of ballast tank 118, which is intentionally rearwardly (or laterally) located at a distance from CG 134 that is ideal for acting against the counterclockwise moment created by the depletion of liquid hydrogen fuel from the hydrogen tank 114.

In order to account for the dynamic depletion of liquid hydrogen from hydrogen tank 114, the correct proportion of water, as calculated by the controller 212 of the control system 200, will be delivered to either the ballast tank 118, in the empennage 110, and/or the water tank 120 to restore the continuously changing CG 134 of the aircraft 100. The calculation for the correct proportion of water to be held within either tank (118 or 120) will depend on the weight distribution of the particular aircraft and the distance from which each of tanks (118, 120, and 114) are located from each other and the CG 134. These distances can be modelled by the equation $(X_{Ballast} - X_{CG}) * m_{Ballast} = (X_{LH2} - X_{CG}) * m_{LH2}$ with $m_{Ballast}$ representing the mass of the water contained in the water ballast tank 118 and $m_{LH2}$ representing the mass of liquid hydrogen in the hydrogen tank 114. The distance $X_{Ballast} - X_{CG}$ represents the longitudinal distance 132 from the water ballast tank 118 to the CG 134 while $X_{LH2} - X_{CG}$ represents the longitudinal distance 130 from the hydrogen tank 114 to the CG 134. The same physical distances (130 and 132) and principles apply for other embodiments in which the tanks (118, 120, and 114) are aligned in the lateral direction as well (see FIG. 6). Since water has a molar mass nine times greater than the molar mass of hydrogen, water may need to be emptied from the control system 200 directly, in embodiments using the valve 204 and release portion 213 to release wastewater to the exterior of the aircraft 215.

By designing the aircraft 100 in a way that the independent mass center and distance from CG 134 for the hydrogen tank 114 is known and given that a mass center for ballast tank 118 is also known or controllable, the aircraft designer can position the ballast tank 118 at a rearward longitudinal location at which its filling can be used to balance CG as liquid hydrogen is released from the hydrogen tank 114 and consumed by the fuel cell 112. Other embodiments (FIG. 6), with lateral positioning of tanks (118, 120, and 114) are possible as well. Water tank 120 may be positioned so that it is at a location that has no effect on the CG 134, or at an alternative forward location on the aircraft 100 to create a moment of opposite effect from the one created in filling ballast tank 118.

In FIG. 2, a valve 204 is shown to release wastewater directly to the exterior of the aircraft 215 for the control system 200 to control the wastewater to maintain the CG 134 of the aircraft. This outlet for wastewater can be used instead of tank 120, or in cooperation with metered flow into either of tanks 120 and/or 118.

Figure 3:
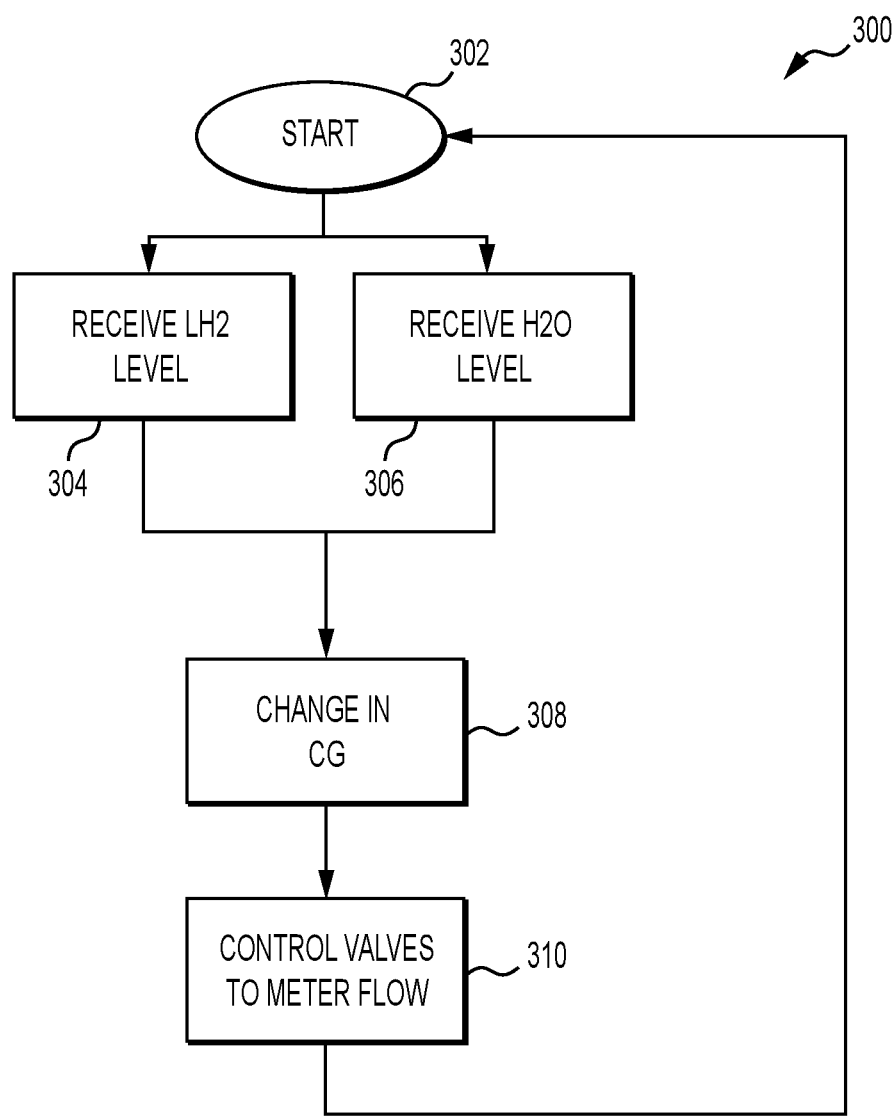
FIG. 3 is a process flow diagram detailing the steps executed by the control system of FIG. 2 in embodiments.

FIG. 3 depicts a high-level flow diagram 300 expressing the processes executed by the controller 212 to accomplish these objectives.

In a step 302 the process begins, and then splits into two parallel steps 304 and 306 (although these steps could also be executed in series). In step 304, controller 212 is relayed fluid level information via communications connection 222 from sensor 224 reflecting a liquid hydrogen level in the hydrogen tank 114. In parallel step 306, the controller 212 receives a water-level reading of the ballast tank 118 from sensor 228 via connection 226. Additionally, in embodiments, controller 212 in step 306 might receive a water-level reading from sensor 225 as to the amount of wastewater existing in water tank 120 via connection 223. See FIG. 2 for sensor-connection arrangements. These sensors 224, 225, and 228 may be a level sensor, or optionally a sensor that determines the mass of hydrogen or water in the tanks using flow into or out of the tank, a weight measurement or some other means capable of determining the mass in the respective tank.

In a step 308, the levels detected in each of tanks 114 and 118 (and possibly the level in tank 120) will be used to determine any change in aircraft mass distribution impacting CG 134. This can be done in a variety of ways, however, one example uses the equation $(X_{Ballast} - X_{CG}) * m_{Ballast} = (X_{LH2} - X_{CG}) * m_{LH2}$ with $m_{Ballast}$ discussed already above. Since the distances in the formula are constants, the controller 212 can measure a change in the mass of liquid hydrogen ($m_{LH2}$) in the hydrogen tank 114 and establish a desired change that must be made in the mass of wastewater existing in the ballast tank 118 ($m_{Ballast}$). A pilot could also input the actual CG position manually to be read by the controller 212.

In step 310, using these formulas, or pilot input, to establish the mass changes needed, known flow dynamic technologies can be used to meter the flow into the ballast tank 118 and possibly the water tank 120, to substantially maintain CG equilibrium. The wastewater not metered to flow into the ballast tank 118 could be either discarded to the exterior of the aircraft 215, diverted to the CG neutral wastewater tank 120, or both. Those skilled in the art will recognize that wastewater tank 120, if not at a location that is CG neutral, could also be incorporated into the calculations using the same formula to recognize mass differences using values received from the sensor 225. The possible uses of the information obtained from sensors 224, 225, and 228 in tanks 114, 118, and 120 and the respective longitudinal (or lateral) distances and locations of the tanks (114, 118, 120) in relation to the CG can be used to maintain CG 134 in numerous different ways to enable the controller 212 to correctly manipulate the fluid levels and thus reduce and eliminate the dynamic moment created by the consumption of hydrogen. To do this, the controller 212 processing information received from connections (220, 223,226) recognizes changes in tank levels (and thus mass differences) so it can execute commands to partially open or close valves 202, 204, 206, and 208 in numerous ways to restore or maintain the original position of the center of gravity 134. Again, sensors 224, 225, and 228 may be level sensors, or optionally sensors that determine the mass of water or hydrogen in the tanks 114, 118, and 120 using flow into or out of the tank, a weight measurement or some other means capable of determining the mass in the respective tank.

More Specific Modes of Operation

Numerous processes of operation can be executed in which the ballast tank 118 can be filled to help maintain CG equilibrium due to the depletion of liquid hydrogen from tank 114. The examples discussed below should only be considered as examples, and the scope of embodiments should not be interpreted as limited by the specifics exemplified below.

1. Metering Between Ballast Tank 118 and Either Exterior of the Aircraft 215 or Tank 120

In other embodiments, where it is advantageous to release the bulk of wastewater to the exterior of the aircraft 215 (e.g., when allowed by regulation) to avoid creating weight in wastewater tank 120, flow could be metered between rearward ballast tank (like tank 118) and released to the exterior of the aircraft 215 to accomplish the CG balance. Only enough wastewater would be introduced to ballast tank 118 as is necessary to create CG equilibrium. This is done by metering the flow between valves 204 and 208, with valve 206 being closed. This is made possible because ballast tank 118 has been established at a greater distance from CG 134 than the hydrogen tank 114, and thus, its filling will create a greater clockwise moment capable of countering and eliminating the counterclockwise moment resulting from liquid hydrogen depletion in hydrogen tank 114 in the described embodiment.

In other situations, the wastewater can be metered between holding tank 120 and ballast tank 118, with no water being released to the exterior of the aircraft 215. In these embodiments, the controller 212 operates valves 206 and 208 to degrees of openness which balance the moment created about CG 134 due to the liquid hydrogen depletion from liquid hydrogen tank 114. Because ballast tank 118 is located in the empennage 110 away from the CG 134 it will create a clockwise moment about the CG 134. Wastewater routed to tank 120 will have negligible impact on the shifting of the CG since its location is a or near the CG 134 eliminating a moment arm necessary for a moment to occur. Alternatively, tank 120 could be at a location (e.g. forward of the CG 134) such that wastewater added will create a counterclockwise moment about the CG countering any shift in equilibrium that could occur from added weight in the empennage 110. This mode of operation might be ideal where wastewater release to the outside environment is forbidden by regulation, or otherwise undesirable.

Figure 4:
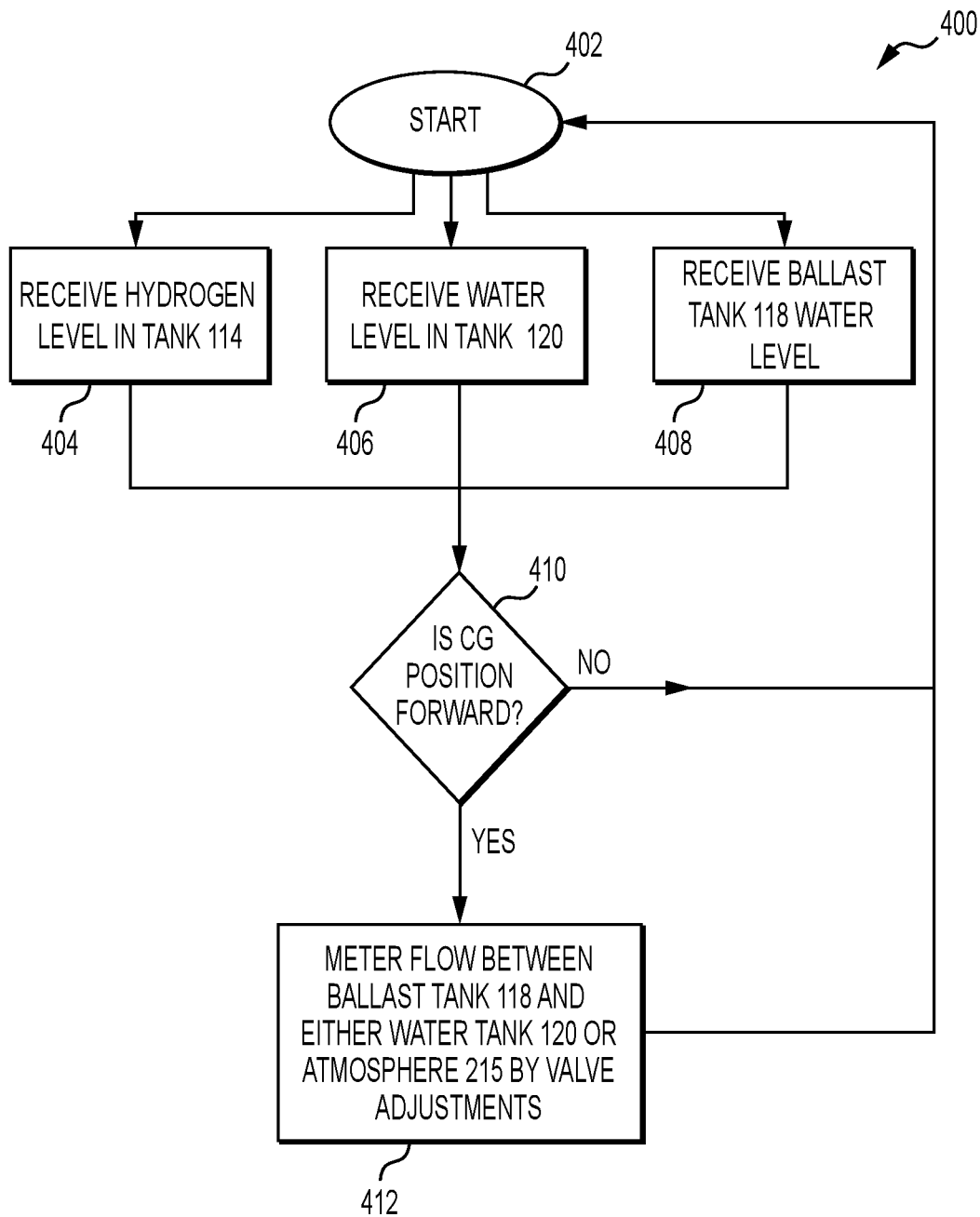
FIG. 4 is a more detailed process flow diagram detailing the steps executed by the control system in embodiments.

FIG. 4 shows a method 400 exemplary of these processes detailing commands executed by the controller 212 to meet the discussed objectives.

In a start step 402 the controller 212 is relayed information from connections 222, 223, and 226 obtained from sensors 224, 225, and 228 detecting fluid levels present in tanks 114, 118, and 120 (FIG. 2). This process is depicted as steps 404, 406, and 408, which could be executed in parallel or possibly in series (FIG. 4). From the fluid levels in tanks 114, 118, and 120 the longitudinal (or lateral) position of the center of gravity 134 of the aircraft is calculated in step 410. If, in step 410 the calculation shows that the CG position 134 has shifted out of balance from the initial CG position of the aircraft 100 (e.g., has shifted forward due to the consumption of hydrogen in tank 114), the process moves to step 412.

In step 412, flow is metered by the controller 212 between the ballast tank 118 and the exterior of the aircraft 215. In instances where it is desirable to release water to the exterior of the aircraft 215, step 412 will involve controller 212 operating valves 202, 204 and valve 208 to relative degrees of openness to accomplish CG equilibrium. In instances where release to the exterior of the aircraft 215 is either not an option or not desirable, step 412 will involve controller 212 operating valves 206 and 208 to relative degrees of openness while closing valve 204 to establish CG equilibrium operating under the assumption that tank 120 is at a CG neutral position.

2. Tank 120 Maintaining Equilibrium Until Full, then Use Ballast Tank (FIG. 4)

In some other embodiments, valves 202 and 206 are open, and valves 204 and 208 are closed, water tank 120 will gradually be filled by water produced as hydrogen is consumed by the fuel cell 112. This consumption simultaneously diminishes the weight in the liquid hydrogen tank 114 while increasing the mass of water in tank 120. Tank 120, in this embodiment, has been sized and positioned at a location on the aircraft such that as liquid hydrogen tank 114 is drained, the filling of tank 120 will have negligible contribution to shift the CG 134 as it is filled using all the wastewater released from the fuel cell 112. Once tank 120 is full, valves 208 (leading to the ballast tank 118) and 204 (leading to the exterior of the aircraft 215) are opened by the controller 212, and flow is metered to create CG equilibrium.

Figure 5:
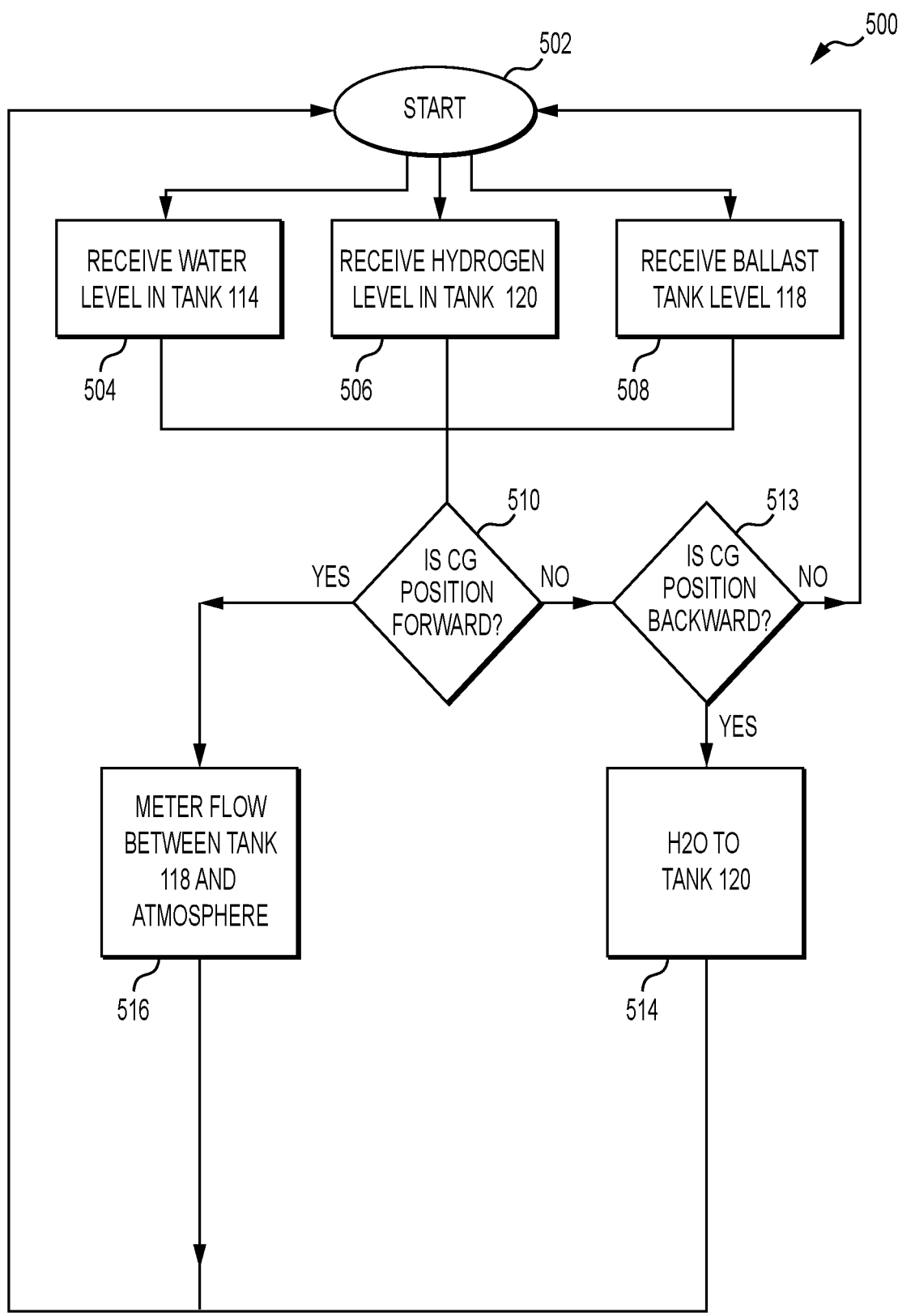
FIG. 5 is an alternative detailed process flow diagram detailing the steps executed by the control system in embodiments.

FIG. 5 includes a flow diagram 500 which reveals even more specifics of an embodiment.

In a step 502 the controller 212 is relayed information from connections 222, 223, and 226 obtained from sensors 224, 225, and 228 detecting fluid levels present in tanks 114, 118, and 120 (see FIG. 2; see also steps 504, 506, and 508 in FIG. 5). From the fluid levels in tanks 114, 118, and 120 the longitudinal (or lateral in other embodiments) position of the center of gravity 134 of the aircraft 100 is calculated in step 510 using the formula discussed above.

If, in step 510 the calculation CG position 134 has shifted forward (or laterally in other embodiments), due to the consumption of liquid hydrogen in hydrogen tank 114, the process moves to step 516 which meters flow between the ballast tank 118 and the exterior of the aircraft 215. If in step 510 the CG position is not shifted forward (or laterally in other embodiments) the process proceeds to step 513.

If in step 513 the CG 134 is shifted backward (or the opposite lateral direction in other embodiments), the process continues to step 514 where the controller 212 opens (or maintains as open) valve 206 (valve 202 also being open, and valve 208 being closed) via connection 218 to supply wastewater directly to water tank 120 to restore equilibrium (assuming tank 120 is at position forward of the CG 134). As discussed, in embodiments tank 120 can be sized and located such that as it fills receiving all of the wastewater released from the fuel cell 112 it will equally compensate or provide no compensation for weight disparities that may exist on the aircraft 100. Thus, if tank 120 is located at a position with no effect on CG 134, then wastewater will not be allowed to fill the tank 120 and the process will loop back to the start 502 regardless of whether the CG is shifted backward. Only if tank 120 is located at a forward (or lateral) position to impact CG will step 514 be allowed to occur. After step 514, the process moves back to start 502.

If the CG position 134 is forward (or lateral) in step 510, the process will move on to a step 516 where the controller 212 shuts off valve 206 and begins to meter valves 204 and 208 such that the wastewater from the fuel cell 112 is split between the ballast tank 118 and released to the exterior of the aircraft 215. Ballast tank 118 will be continually filled at a rate that creates a clockwise moment to equally counter the moment created by liquid hydrogen depletion in hydrogen tank 114. Any mass added to ballast tank 118 has a substantial effect in countering CG 134 displacement due to hydrogen consumption. Oftentimes, much of the water is released to the exterior of the aircraft 215.

3. Simultaneous Metering Between Both Tanks and the Exterior of the Aircraft 215.

In this embodiment, controller 212 would be configured to simultaneously operate all of valves 204, 206, and 208 to varying degrees of openness to establish substantial CG equilibrium. The process would look much like the one disclosed in FIG. 4, except that step 412 would involve metered flows into tank 120, ballast tank 118, and to the exterior of the aircraft 215 at once, the flow rates being controlled such that equilibrium is substantially maintained.

Features described above as well as those claimed below may be combined in various ways without departing from the scope hereof. The following examples illustrate some possible, non-limiting combinations:

(A1). An aircraft comprising: a hydrogen tank having a center of mass located at a first distance from the center of gravity (CG) of the aircraft; a fuel cell configured to consume hydrogen from the hydrogen tank; a ballast tank located at a second distance from the CG of the aircraft; a conduit connecting the fuel cell and the ballast tank; wherein the conduit is configured to receive wastewater resulting from the fuel cell and deliver at least part of the wastewater to the ballast tank; wherein the wastewater delivered to the ballast tank counterbalances a moment created by a depletion of hydrogen due to consumption of the fuel cell.

(A2). The aircraft of (A1) wherein a release portion of the conduit is configured to deliver wastewater to an exterior of the aircraft.

(A3). The aircraft of (A1) or (A2) wherein the conduit is configured to deliver at least part of the wastewater to a water tank positioned nearer the CG of the aircraft than is the ballast tank.

(A4). The aircraft of (A1)-(A3) comprising a controller wherein the controller communicatively connects to a plurality of valves and operatively controls the open/closed of the valves to control distribution of wastewater to an exterior of the aircraft, the ballast tank, and the water tank.

(A5). The aircraft of (A1)-(A4) wherein when the CG of the aircraft shifts forward, the controller controls at least one valve to distribute wastewater to the ballast tank.

(A6). The aircraft of (A1)-(A5) wherein when the CG of the aircraft is not shifted, the controller controls at least one valve to distribute wastewater to the exterior of the aircraft.

(A7). The aircraft of (A1)-(A6) wherein when the CG of the aircraft shifts rearward, the controller controls at least one valve to distribute wastewater to the water tank.

(A8). The aircraft of (A1)-(A7) wherein the controller controls at least one valve to release hydrogen in the hydrogen tank to the exterior of the aircraft.

(A9). The aircraft of (A1)-(A8) wherein the ballast tank and the hydrogen tank are located in an aircraft empennage.

(A10). The aircraft of (A1)-(A9) wherein the ballast tank is located at an aircraft wing end and the hydrogen tank is located in an aircraft nacelle.

(A11). A system comprising: a hydrogen tank located a first distance from a center of gravity (CG) of an aircraft; a ballast tank located a second distance from the CG of the aircraft; a fuel cell configured to consume hydrogen received from the hydrogen tank and produce wastewater, the system configured to deliver wastewater to the ballast tank; a controller configured to cause the system to distribute wastewater to the ballast tank to restore an imbalance in the CG.

(A12). The system of (A11) comprising a plurality of hydrogen conduit sections configured to deliver hydrogen and a plurality of wastewater conduit sections configured to deliver wastewater.

(A13). The system of (A11) or (A12) wherein the hydrogen tank includes a hydrogen-level sensor configured to detect an amount of hydrogen in the hydrogen tank and the ballast tank includes a water-level sensor configured to detect an amount of wastewater in the ballast tank, and the hydrogen-level and water-level sensors are each communicatively coupled to the controller.

(A14). The system of (A11)-(A13) wherein the controller is configured to meter wastewater flow between the ballast tank and an exterior of the aircraft to control CG shift of the aircraft.

(A15). The system of (A11)-(A14) wherein the controller meters wastewater flow between the ballast, tank, an exterior of the aircraft, and a water tank to control CG shift of the aircraft.

(A16). A method for having a wastewater balancer, the method comprising: supplying hydrogen stored in a hydrogen tank to a fuel cell to generate power for use on an aircraft; distributing a wastewater biproduct created from the fuel cell to a first tank and a second tank wherein an amount of wastewater is distributed to counterbalance a moment created from depletion of hydrogen in the hydrogen tank.

(A17). The method of (A16) comprising the hydrogen tank, the first tank, and the second tank being known distances away from a center of gravity of the aircraft.

(A18). The method of (A16) or (A17) comprising positioning the first tank a distance away from a center of gravity to effectively counterbalance the moment.

(A19). The method of (A16)-(A18) comprising positioning the second tank a distance near a center of gravity such that its filling has less of an effect on the moment than the first tank.

(A20). The method of (A16)-(A19) comprising a plurality of valves communicatively connected to a controller wherein the controller controls the open/closed of the valves to control distribution of the wastewater to the first and second tanks to control a center of gravity of the aircraft.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. An aircraft comprising:
    a hydrogen tank having a center of mass located at a first distance from the center of gravity (CG) of the aircraft;
    a fuel cell configured to consume hydrogen from the hydrogen tank;
    a ballast tank located at a second distance from the CG of the aircraft;
    a conduit connecting the fuel cell and the ballast tank;
    wherein the conduit is configured to receive wastewater resulting from the fuel cell and deliver at least part of the wastewater to the ballast tank and at least part of the wastewater to an exterior of the aircraft;
    wherein the wastewater delivered to the ballast tank counterbalances a moment created by a depletion of hydrogen due to consumption of the fuel cell.

2. The aircraft of claim 1 wherein the conduit is configured to deliver at least part of the wastewater to a water tank positioned nearer the CG of the aircraft than is the ballast tank.

3. The aircraft of claim 2 comprising a controller wherein the controller communicatively connects to a plurality of valves and operatively controls the open/closed of the valves to control distribution of wastewater to an exterior of the aircraft, the ballast tank, and the water tank.

4. The aircraft of claim 3 wherein when the CG of the aircraft shifts forward, the controller controls at least one valve to distribute wastewater to the ballast tank.

5. The aircraft of claim 3 wherein when the CG of the aircraft is not shifted, the controller controls at least one valve to distribute wastewater to the exterior of the aircraft.

6. The aircraft of claim 3 wherein when the CG of the aircraft shifts rearward, the controller controls at least one valve to distribute wastewater to the water tank.

7. The aircraft of claim 3 wherein the controller controls at least one valve to release hydrogen in the hydrogen tank to the exterior of the aircraft.

8. The aircraft of claim 1 wherein the ballast tank and the hydrogen tank are located in an aircraft empennage.

9. The aircraft of claim 1 wherein the ballast tank is located at an aircraft wing end and the hydrogen tank is located in an aircraft nacelle.

10. A system comprising:
    a hydrogen tank located a first distance from a center of gravity (CG) of an aircraft;
    a ballast tank located a second distance from the CG of the aircraft;
    a fuel cell configured to consume hydrogen received from the hydrogen tank and produce wastewater, the system configured to deliver wastewater to the ballast tank;
    a controller configured to cause the system to distribute at least part of the wastewater to the ballast tank and at least part of the wastewater to an exterior of the aircraft to restore an imbalance in the CG.

11. The system of claim 10 comprising a plurality of hydrogen conduit sections configured to deliver hydrogen and a plurality of wastewater conduit sections configured to deliver wastewater.

12. The system of claim 10 wherein the hydrogen tank includes a hydrogen-level sensor configured to detect an amount of hydrogen in the hydrogen tank and the ballast tank includes a water-level sensor configured to detect an amount of wastewater in the ballast tank, and the hydrogen-level and water-level sensors are each communicatively coupled to the controller.

13. The system of claim 10 wherein the controller meters wastewater flow between the ballast, tank, an exterior of the aircraft, and a water tank to control CG shift of the aircraft.

14. A method for having a wastewater balancer, the method comprising:
    supplying hydrogen stored in a hydrogen tank to a fuel cell to generate power for use on an aircraft;
    distributing a wastewater biproduct created from the fuel cell to a first tank, a second tank, and an exterior of the aircraft, wherein an amount of wastewater is distributed to counterbalance a moment created from depletion of hydrogen in the hydrogen tank.

15. The method of claim 14 comprising the hydrogen tank, the first tank, and the second tank being known distances away from a center of gravity of the aircraft.

16. The method of claim 14 comprising positioning the first tank a distance away from a center of gravity to effectively counterbalance the moment.

17. The method of claim 14 comprising positioning the second tank a distance near a center of gravity such that its filling has less of an effect on the moment than the first tank.

18. The method of claim 14 comprising a plurality of valves communicatively connected to a controller wherein the controller controls the open/closed of the valves to control distribution of the wastewater to the first and second tanks to control a center of gravity of the aircraft.

* * * * *